(12) United States Patent
Sakamoto et al.

(10) Patent No.: US 6,561,300 B1
(45) Date of Patent: May 13, 2003

(54) VEHICLE SEAT HAVING PASSENGER DETECTOR

(75) Inventors: Kazunori Sakamoto, Chiryu (JP); Hidekazu Kogita, Kariya (JP); Morio Sakai, Toyota (JP); Osamu Fujimoto, Nisshin (JP)

(73) Assignees: Aisin Seiki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 30 days.

(21) Appl. No.: 09/722,885

(22) Filed: Nov. 28, 2000

(30) Foreign Application Priority Data

Nov. 30, 1999  (JP) ............................. 11-341168

(51) Int. Cl.$^7$ ................................. B60T 7/14
(52) U.S. Cl. ................. 180/273; 280/805; 180/290; 340/667
(58) Field of Search ................. 280/805, 735, 280/734; 180/290, 273; 340/667

(56) References Cited

U.S. PATENT DOCUMENTS

| 6,069,325 | A  | * | 5/2000 | Aoki ........................ 177/136 |
| 6,176,543 | B1 | * | 1/2001 | Nawata et al. ............. 296/189 |
| 6,224,160 | B1 | * | 5/2001 | Takeuchi et al. ........ 297/440.15 |
| 6,231,076 | B1 | * | 5/2001 | Blakesley et al. .......... 180/271 |
| 6,293,585 | B1 | * | 9/2001 | Bruns et al. ................ 177/136 |
| 6,323,444 | B1 | * | 11/2001 | Aoki ........................ 177/144 |
| 6,356,200 | B1 | * | 3/2002 | Hamada et al. ............ 180/273 |

FOREIGN PATENT DOCUMENTS

| EP | 1020320 A2 | * 1/2000 | ................. 280/735 |
| JP | 11-1153    | 1/1999   | |
| JP | 11-1154    | 1/1999   | |
| JP | 11-94637   | 4/1999   | |
| JP | 11-108746  | 4/1999   | |
| JP | 11-304579  | 11/1999  | |

* cited by examiner

*Primary Examiner*—Paul N. Dickson
*Assistant Examiner*—Toan C To
(74) *Attorney, Agent, or Firm*—Burns, Doane, Swecker & Mathis, LLP

(57) ABSTRACT

A detector for detecting the load applied to a passenger seat of an automobile equipped with an air bag. The load detector includes a sensor bracket having a deformation portion that deforms in accordance with the amount of the load. A strain sensor is arranged on the deformation portion to detect the degree of deformation of the deformation portion. A force limiter bracket is located adjacent to the sensor bracket to limit deformation of the deformation portion within a predetermined range. An anchor bracket is formed integrally with the force limiter bracket and is connected to a seat belt.

18 Claims, 8 Drawing Sheets

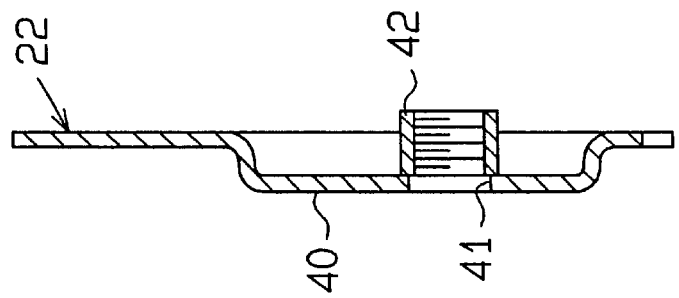
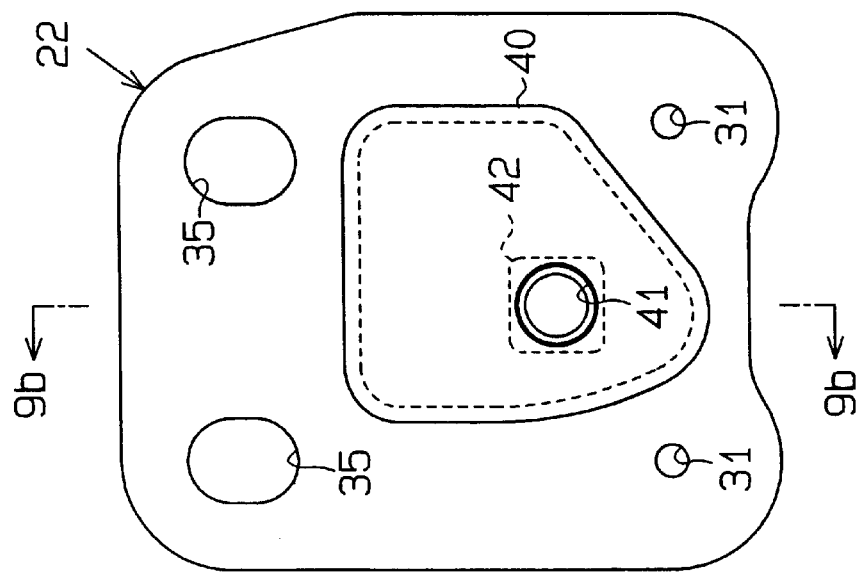

VEHICLE SEAT HAVING PASSENGER DETECTOR

BACKGROUND OF THE INVENTION

The present invention relates to a vehicle seat, and more particularly, to a vehicle seat having a passenger detector.

A vehicle equipped with an air bag is typically provided with a passenger detector, or a load detector. The passenger detector detects whether a passenger is sitting on a seat or the passenger's weight. The amount of gas generated to inflate the air bag is adjusted in accordance with the detection.

Japanese Unexamined Patent Publication No. 11-1153 describes a detector employing a load cell to detect the weight applied by a vehicle seat. The load cell is located between a rail, which supports the seat, and a mount bracket, which secures the rail to the passenger compartment floor.

Japanese Unexamined Patent Publication No. 11-1154 describes a detector employing a link unit to detect the load applied to a seat cushion. The link unit is located between the seat cushion and a frame, which supports the seat cushion. The link unit is pivoted in accordance with the load of the seat cushion. The load detector detects the seat load based on the position of the link unit.

Japanese Unexamined Patent Publication NO. 11-94637 also describes a detector employing a link unit to detect the load applied to a seat cushion. The link unit is located between a slide rail and the seat cushion. The load detector detects the seat load based on the position of the link unit.

However, the conventional load detectors are complicated and large. Further, the accuracy of the conventional load detectors is relatively low.

Generally, the retaining force produced by a seat belt acts on the seat. This may result in the load detector inaccurately detecting the passenger's weight. Further, when a child safety seat is mounted on the vehicle seat, a large load is applied to the vehicle seat. Thus, a load detector that is not affected by the restraining force of a seat belt has been sought after.

SUMMARY OF THE INVENTION

It is an object of the present invention to provide a vehicle seat having a simple and highly accurate passenger detector.

To achieve the above object, the present invention provides a vehicle seat including a seat cushion and a load detector for detecting the load applied to the seat cushion. The load detector includes a sensor bracket having a deformation portion, which is deformed in accordance with the degree of the load. A strain sensor is arranged on the deformation portion to detect the degree of deformation of the deformation portion. A force limiter bracket is adjacent to the sensor bracket to limit deformation of the deformation portion within a predetermined range. An anchor bracket is formed integrally with the force limiter bracket. The anchor bracket is attached to a seat belt.

A further aspect of the present invention provides a vehicle seat arranged on an upper support that moves along a lower support, which is fixed to the floor of a passenger compartment. The seat includes a seat cushion, a seat frame for supporting the seat cushion, and a load detector arranged between the upper support and the seat frame to detect the load applied to the seat cushion. The load detector includes a sensor bracket having a deformation portion, which is deformed in accordance with the degree of the load, and first and second connecting holes. A strain sensor is arranged on the deformation portion to detect deformation of the deformation portion. A force limiter bracket is located adjacent to the sensor bracket. The force limiter bracket has a fastening hole and a restricting hole. The force limiter bracket limits deformation of the deformation portion within a predetermined range. A first bolt is fitted in the first connecting hole and the restricting hole to fix the sensor bracket to the seat frame. A second bolt is fitted in the second connecting hole and the fastening hole to fix the second bracket to the upper support. An anchor bracket is formed integrally with the force limiter bracket and attached to a seat belt.

Another aspect of the present invention provides a load detector arranged between a vehicle seat and the floor of a passenger compartment to detect the load applied to the seat. The load detector includes a sensor bracket having a deformation portion, which is deformed in accordance with the degree of the load, and first and second connecting holes. A strain sensor is arranged on the deformation portion to detect deformation of the deformation portion. A force limiter bracket is located adjacent to the sensor bracket. The force limiter bracket has a fastening hole aligned with the force connecting hole and a restricting hole aligned with the second connecting hole. The force limiter bracket limits deformation of the deformation portion within a predetermined range. An anchor bracket is formed integrally with the force limiter bracket and attached to a seat belt.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 9(a) is a front view showing a force limiter bracket;

FIG. 9(b) is a cross-sectional view showing the force limiter bracket and taken along line 9b—9b of FIG. 9(a);

DETAILED DESCRIPTION OF THE PREFERRED EMBODIMENTS

An automobile seat 1 according to a first embodiment of the present invention will now be described with reference to the drawings.

Figure 1:
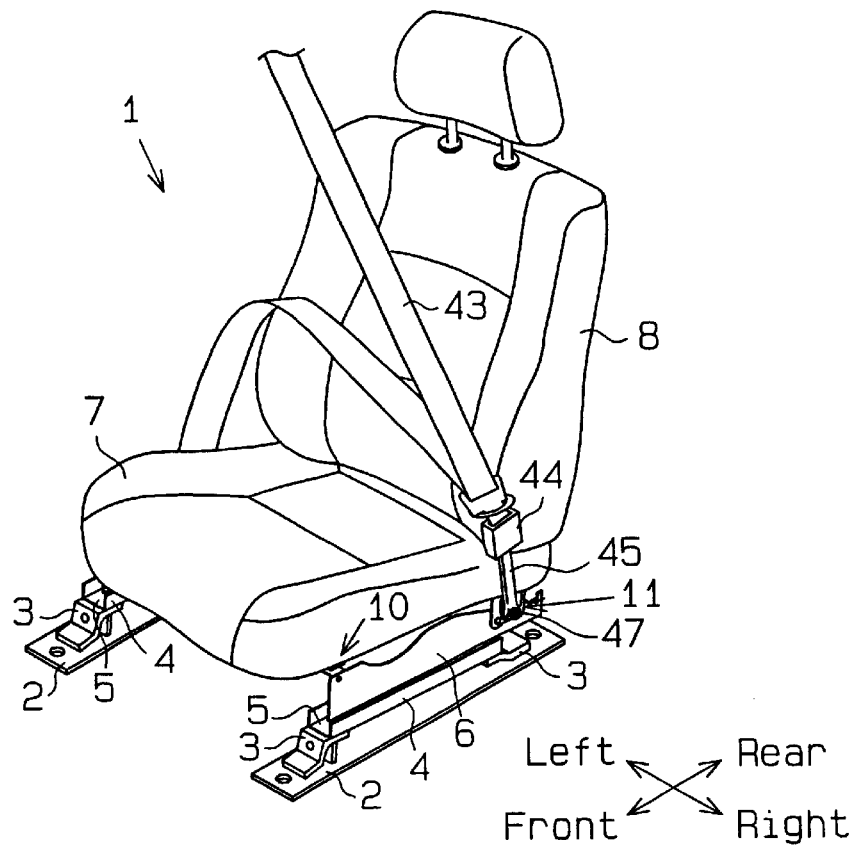
FIG. 1 is a perspective view showing a vehicle seat according to a first embodiment of the present invention.

As shown in FIG. 1, the seat 1 is supported on two base frames 2 and includes a seat cushion 7 and a seatback 8. The two base frames 2 are parallel and are secured to the floor of a passenger compartment. Two base brackets 3 are fixed to each base frame 2. Each pair of the base brackets 3 supports a lower support 4, which is lower rail in this embodiment. The lower support 4 has a U-shaped slide groove 5. A pair of upper supports 6, which are upper rails in this embodiment, are attached to the seat 1. Each of the upper supports 6 is received in and can slide along the slide groove 5 of an associated one of the lower supports 4.

Figure 2:
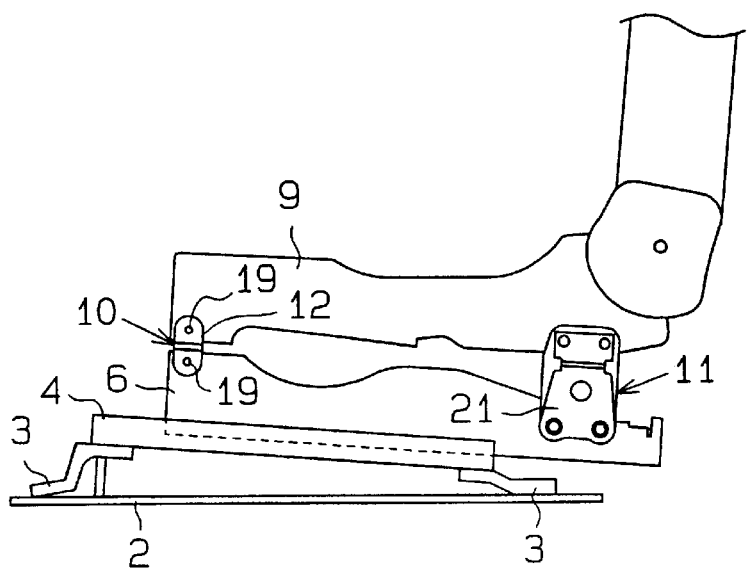
FIG. 2 is a schematic side view showing the frame of the seat of FIG. 1.

FIG. 2 shows the frame of the seat 1. A seat frame 9 supports the seat cushion 7 and the seatback 8. A front load detector 10 and a read load detector 11 are arranged between each of the upper supports 6 and the seat frame 9. The structure of the left front load detector 10 is a mirror-image of the structure of the right front load detector 10. The structure of the left rear load detector 11 is a mirror-image of the structure of the right rear load detector 11. Thus, only the right front and rear load detectors 10, 11 will be discussed below.

Figure 7A:
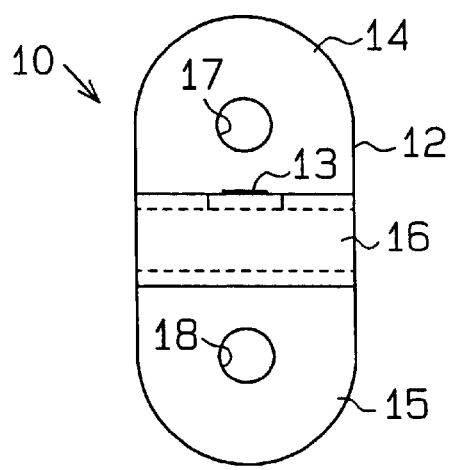
FIG. 7(a) is a front view showing a front load detector.
Figure 7B:
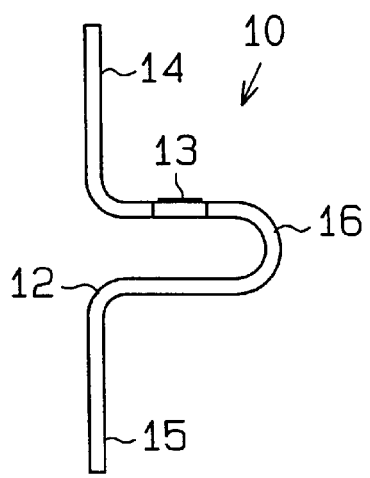
FIG. 7(b) is a side view showing the front load detector.

With reference to FIGS. 7(a) and 7(b), the front load detector 10 includes a front sensor bracket 12 and a front strain sensor (strain detecting element) 13. The front sensor bracket 12 has an upper portion 14, a lower portion 15 and a bent deformation portion 16. The deformation portion 16 extends continuously between the upper and lower portions 14, 15. The strain sensor 13 is affixed to the deformation portion 16. An upper bolt hole 17 extends through the upper portion 14, and a lower bolt hole 18 extends through the lower portion 15. The upper and lower portions 14, 15 are respectively fastened to the seat frame 9 and the upper support 6 by bolts 19 that are inserted through the upper and lower bolt holes 17, 18. The front load detector 10 connects and determines the distance between the seat frame 9 and the upper support 6.

The deformation portion 16 is deformed in accordance with the load applied to the seat cushion 7. The front strain sensor 13 electrically detects the degree of deformation of the deformation portion 16 and provides a detection signal to a controller (not shown).

Figure 4:
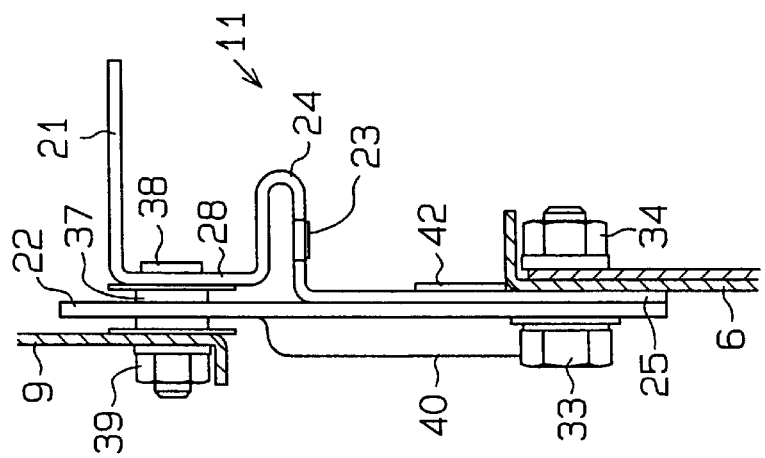
FIG. 4 is a side view showing the rear load detector.
Figure 3:
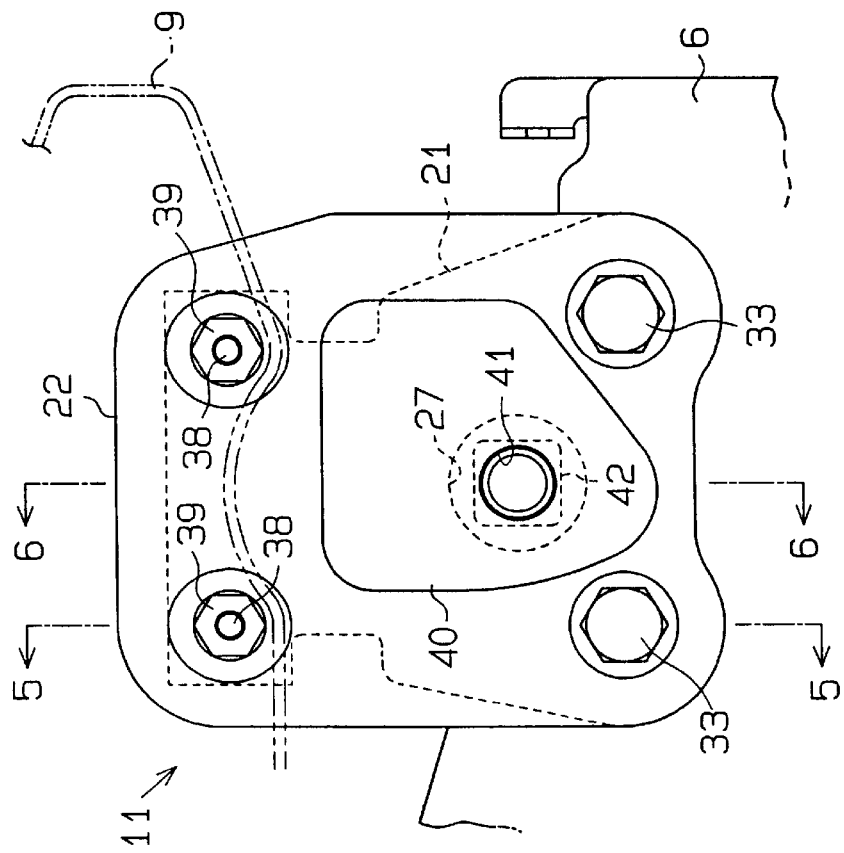
FIG. 3 is a front view showing a rear load detector.

As shown in FIG. 4, the rear load detector 11 includes a rear sensor bracket 21, a force limiter bracket (deformation restriction plate) 22, and a rear strain sensor (strain detecting element) 23.

Figure 8A:
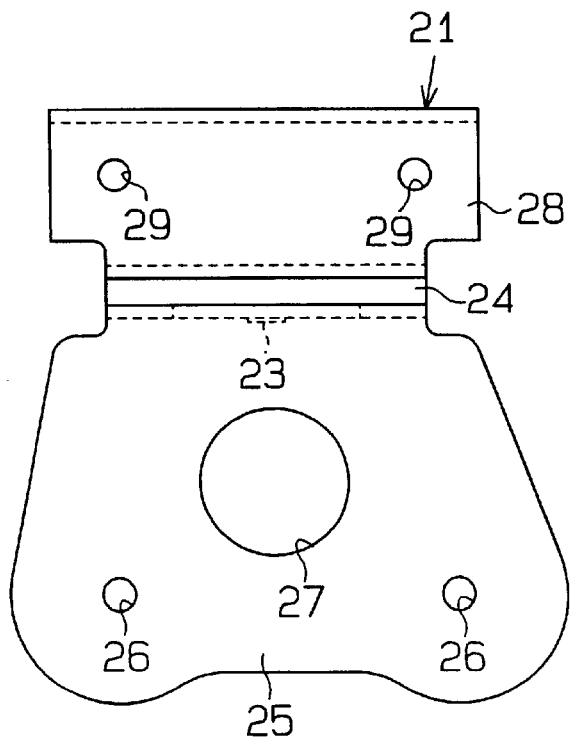
FIG. 8(a) is a front view showing a rear sensor bracket.
Figure 8B:
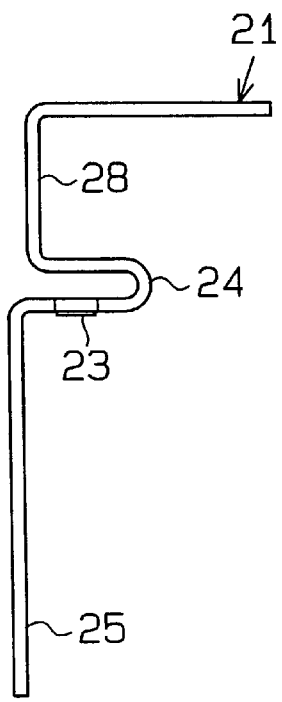
FIG. 8(b) is a side view showing the rear sensor bracket.

With reference to FIGS. 8(a) and 8(b), the rear sensor bracket 21 has a bent deformation portion 24, a lower portion 25 extending downward from the deformation portion 24, and an upper portion 28 extending upward from the deformation portion 24. The rear strain sensor 23 is affixed to the deformation portion 24. A pair of lower bolt holes 26 and a nut hole 27 extend through the lower portion 25. The diameter of the nut hole 27 is greater than that of the lower bolt holes 26. A pair of upper bolt holes 29 extend through the upper portion 28. The upper end of the upper portion 28 is bent so that it extends substantially parallel to the deformation portion 24.

The deformation portion 24 is deformed in accordance with the degree of the load acting on the seat cushion 7. The rear strain sensor 23 electrically detects the degree of deformation of the deformation portion 24 and provides a detection signal to the controller.

Figure 5:
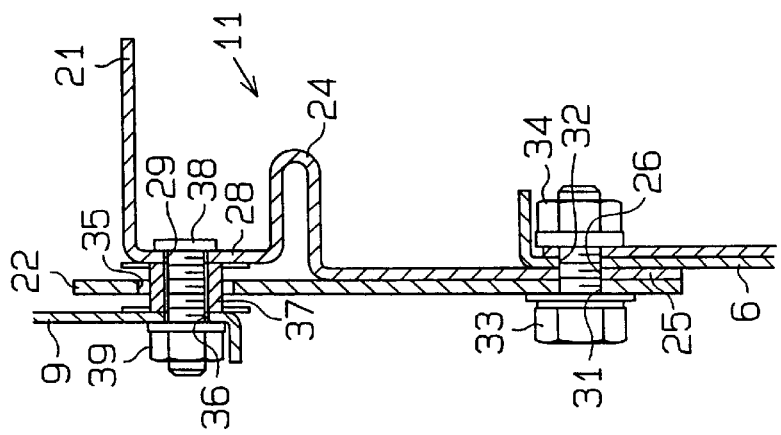
FIG. 5 is a cross-sectional view of the rear load detector taken along line 5—5 of FIG. 3.

When an excessive load acts on the seat cushion 7, the force limiter bracket 22 limits the deformation of the rear sensor bracket 21 so that the deformation is within a predetermined range. As shown in FIGS. 5 and 9(a), a pair of fastening holes 31 extend through the lower portion of the force limiter bracket 22. The diameter of the fastening hole 31 is substantially the same as the diameters of the lower bracket bolt holes 26 and support holes 32, which are formed at the rear portion of the upper support 6. The rear sensor bracket 21 and the force limiter bracket 22 are fastened to the upper support 6 by fasteners, which are bolts 33 and nuts 34 is this embodiment. The heads of the bolts 33 are located on one side of the force limiter bracket 22, and the deformation portion 24 is located on the other side of the force limiter bracket 22. The diameter of the bolts 33 is substantially the same as the diameters of the bolt holes 26, 31, 32. Accordingly, there is no space between the bolts 33 and the corresponding walls of the bolt holes 26, 31, 32.

Referring to FIG. 9(a), two elongated holes (movement restriction holes) 35 extend through the force limiter bracket 22 in correspondence with the upper bracket bolt holes 29 and frame bolt holes 36. The width and length of the elongated holes 35 is greater than the diameters of the upper bracket bolt holes 29 and the frame bolt holes 36. As shown in FIG. 5, a cylindrical spacer 37 is extended through each elongated hole 35. The spacer 37 is fitted on a connecting bolt 38 and forms a gap between the seat frame 9 and the rear sensor bracket 21. The outer diameter of the spacer 37 is smaller than the width and length of the elongated holes 35. Accordingly, the movement of the spacer 37 is tolerated in the elongated hole 35. In other words, the movement of the spacer 37 is restricted within a predetermined area by contact between the outer surface of the spacer 37 and the wall of the elongated hole 35. Thus, the walls of the elongated holes 35 are referred to as movement restriction surfaces.

Nuts 39 are fastened to the connecting bolts 38 to secure the rear sensor bracket 21 to the seat frame 9. More specifically, the connecting bolts 38 are inserted through the corresponding upper bracket bolt holes 29, the elongated holes 35, and the frame bolt holes 36 and fastened by the nuts 39. The rear load detector 11 connects and determines the distance between the seat frame 9 and the upper support 6.

An anchor projection 40 projects away from the rear sensor bracket 21 at the middle portion of the force limiter bracket 22. The anchor projection 40 has an anchor bolt hole 41. An anchor nut 42 is welded to the inner surface of the anchor projection 40. The outer diameter of the anchor nut 42 is smaller than the diameter of the nut hole 27. This enables the anchor nut 42 to move within the nut hole 27.

Figure 6:
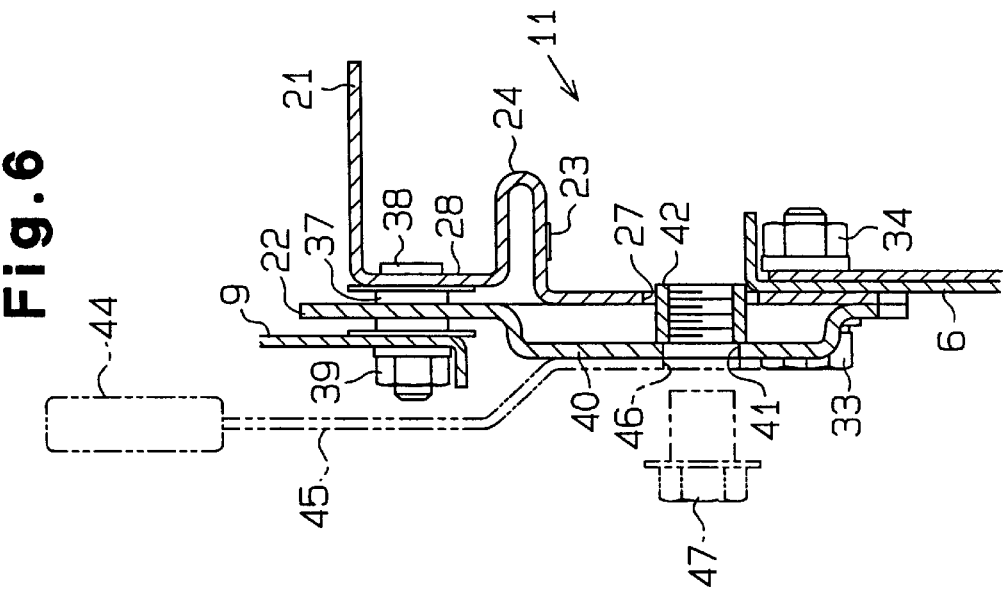
FIG. 6 is a cross-sectional view showing the rear load detector and taken along line 6—6 of FIG. 3.

When in use, a seat belt 43 is fastened to a belt anchor 44 (FIG. 1). Referring to FIG. 6, the belt anchor 44 is connected to the anchor projection 40 by an anchor bracket 45. A bolt hole 46 extends through the anchor bracket 45. The diameter of the bolt hole 46 is substantially the same as the anchor bolt hole 41. An anchor bolt 47 is inserted through the bolt holes 46, 41 and fastened to the anchor nut 42. This secures the belt anchor 44 to the force limiter bracket 22.

In the first embodiment, as viewed in FIG. 1, the anchor bracket 45 is connected to the force limiter bracket 22 of the right rear load detector 11. The anchor bracket 45 is not connected to the left rear load detector 11.

The seat 1 of the first embodiment has the advantages described below.

(1) The load applied to the upper surface of the seat cushion 7 is transferred to the seat frame 9 thereby deforming the front and rear deformation portions 16, 24. The degree of deformation of each deformation portion 16, 24 is detected by the associated strain sensors 13, 23. Thus, the front and rear load detectors 10, 11 detect whether a passenger is sitting on the seat 1.

(2) The force limiter bracket 22 prevents excessive deformation of the sensor bracket 21 and thus maintains the desired detection characteristics of the rear strain sensor 23. When a relatively large load is applied to the seat cushion 7, the spacers 37 contact the bottom wall of the associated elongated holes 35. This restricts further deformation of the rear deformation portion 24. As a result, the detection characteristics of the rear strain sensor 23 remain unaffected.

(3) The anchor bracket 45 of the seat belt 43 is easily connected to the force limiter bracket 22. For example, by fixing the anchor bracket 45 to the force limiter bracket 22 beforehand, the anchor bracket 45 may be connected to the seat 1 by merely connecting the force limiter bracket 22 to the seat 1. This decreases the time for installing the seat 1.

(4) The rear sensor bracket 21 and the force limiter bracket 22 are fixed to the upper support 6 by a single connection bolt 33. Further, the procedure for connecting the rear sensor bracket 21 to the seat frame 9 is performed with the connecting bolts 38 inserted in the elongated holes 35. Accordingly, the attachment of the rear sensor bracket 21 and the attachment of the force limiter bracket 22 are performed simultaneously. This decreases the assembly time of the seat 1.

(5) The anchor bracket 45 is connected to the force limiter bracket 22 only by the anchor bolt 47. Thus, the anchor bracket 45 may be connected to either one of the force limiter brackets 22 located on the left side and the right side of the seat 1.

An automobile seat 1 according to a second embodiment of the present invention will now be described with reference to FIGS. 10 to 14. The seat 1 of the second embodiment is substantially the same as that of the first embodiment except for a force limiter bracket 52 of a rear load detector 51.

Figure 11:
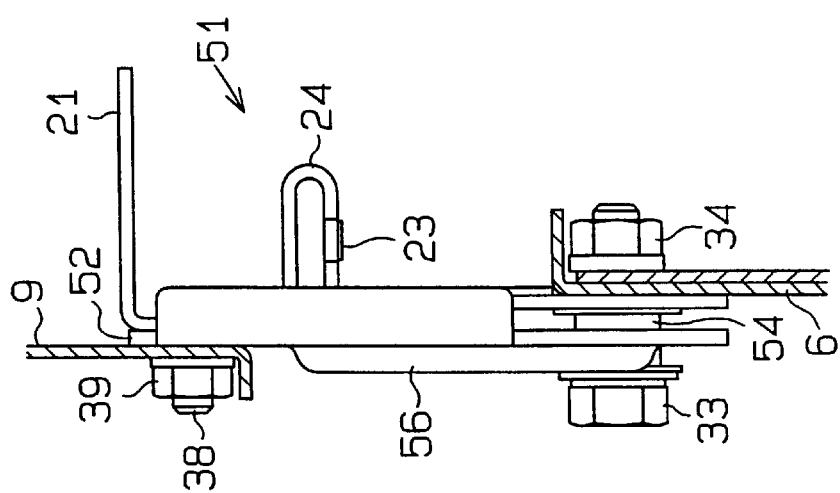
FIG. 11 is a side view showing the rear load detector of FIG. 10.
Figure 10:
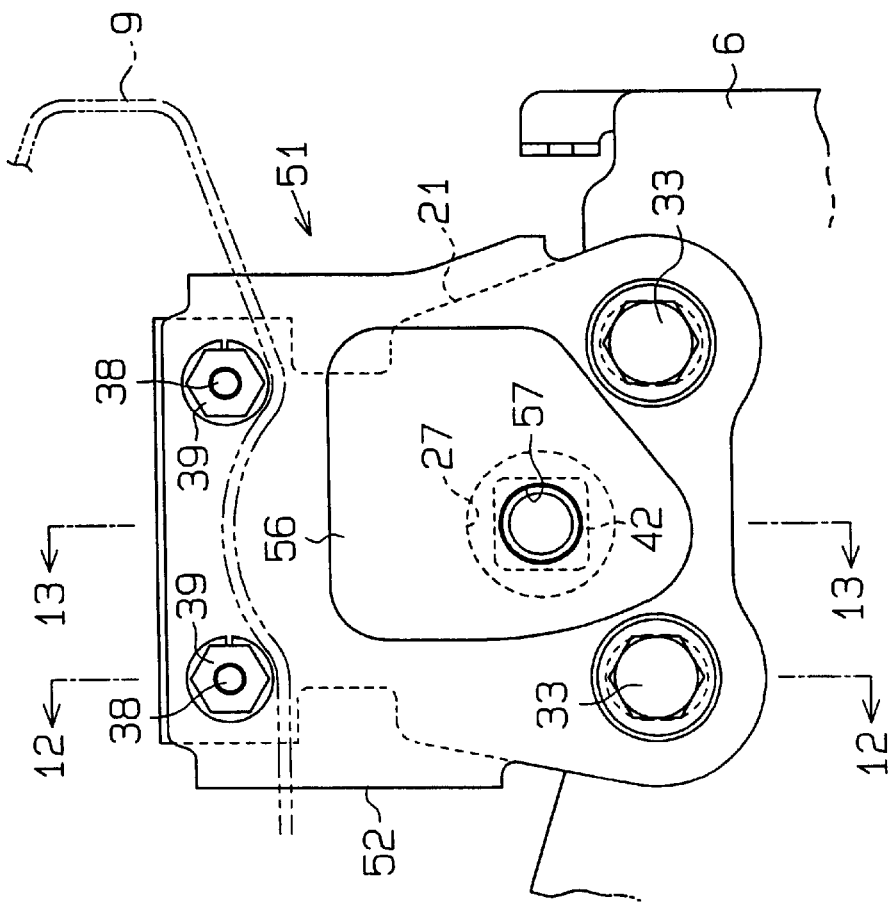
FIG. 10 is a front view showing a rear load detector according to a second embodiment of the present invention.
Figure 14A:
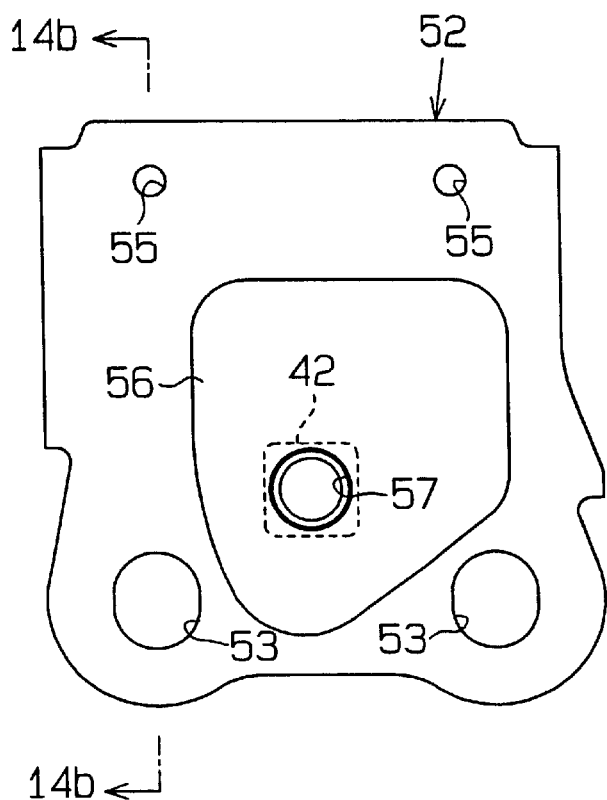
FIG. 14(a) is a front view showing a force limiter bracket of the second embodiment.
Figure 14B:
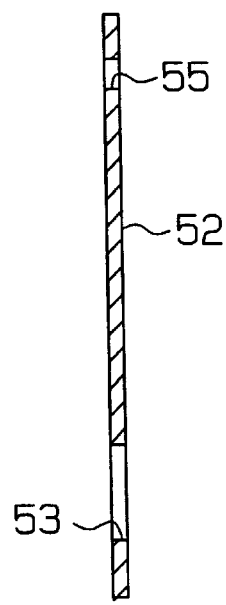
FIG. 14(b) is a cross-sectional view showing the force limiter bracket and taken along line 14b—14b of FIG. 14(a).

As shown in FIGS. 10 and 11, the rear load detector 51 includes the force limiter bracket 52. Referring to FIGS. 14(a) and 14(b), two elongated holes (movement restriction holes) 53 extend through the lower portion of the force limiter bracket 52. The width and length of each elongated hole 53 is greater than the diameter of the lower bracket bolt holes 26.

Figure 12:
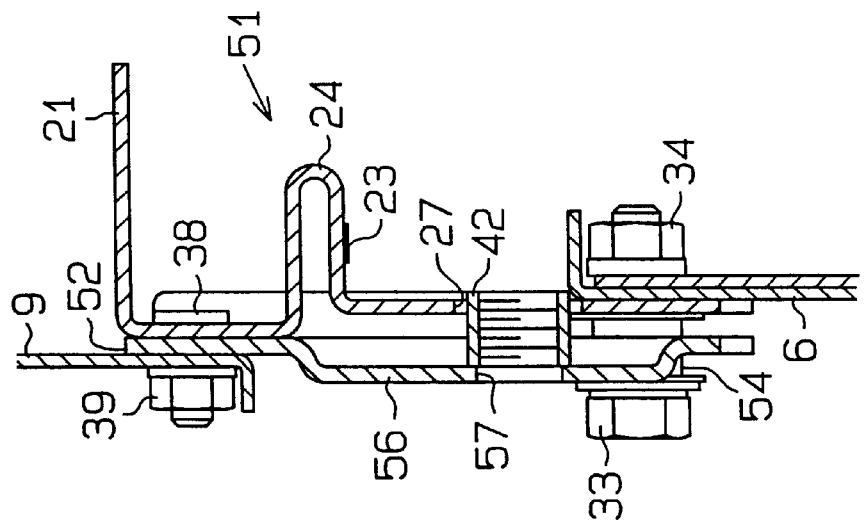
FIG. 12 is a cross-sectional view showing the rear load detector and taken along line 12—12 of FIG. 10.

With reference to FIG. 12, the connecting bolts 33 are inserted through the corresponding holes 26, 32, 53 and fastened by the nuts 34. This connects the rear sensor bracket 21 to the upper support 6. A cylindrical spacer 54 is arranged in each elongated hole 53 between the head of the corresponding bolt 33 and the rear sensor bracket 21.

The diameter of the bolts 33 is substantially the same as the diameters of the bolt holes 26, 32. Accordingly, there is no space between the bolts 33 and the walls of the bolt holes 26, 32. The outer diameter of each spacer 54 is smaller than the width and length of the associated elongated hole 53. This forms a space between the spacer 54 and the wall of the elongated hole 53. Thus, the movement of the spacer 54 is tolerated in the elongated hole 53. In other words, the movement of the spacer 54 is restricted within a predetermined area by contact between the outer surface of the spacer 54 and the wall of the elongated hole 53.

Two fastening holes 55 are formed at the upper portion of the force limiter bracket 52 in correspondence with the upper bracket bolt holes 29 and the frame bolt holes 36. The diameter of the fastening holes 55 is substantially the same as the diameter of the upper bracket bolt holes 29.

The connecting bolts 38 are inserted through the corresponding upper bolt holes 29, the fastening holes 55, and the frame bolt holes 36 and fastened by the nuts 39. This connects the rear sensor bracket 21 and the force limiter bracket 52 to the seat frame 9. The diameter of the connecting bolts 38 is substantially the same as the diameters of the bolt holes 29, 36, 55. Thus, there is no space between the connecting bolts 38 and the walls of the bolt holes 26, 31, 32. The rear load detector 51 connects and determines the distance between the seat frame 9 and the upper support 6.

Figure 13:
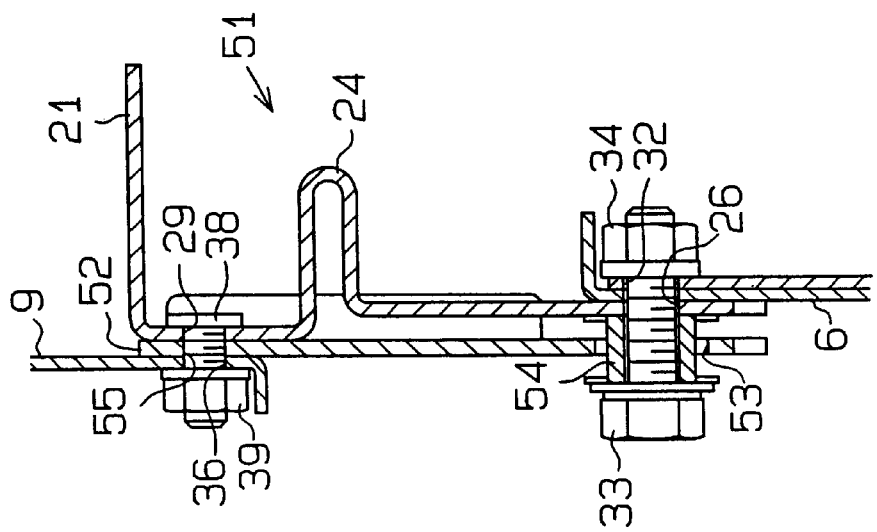
FIG. 13 is a cross-sectional view showing the rear load detector and taken along line 13—13 of FIG. 10.

With reference to FIGS. 13 and 14(a), an anchor projection 56 projects away from the rear sensor bracket 21 at the middle portion of the force limiter bracket 52. The anchor projection 56 has an anchor bolt 57 located at a position corresponding to the nut hole 27. The anchor bracket 45 of the belt anchor 44 is connected to the anchor projection 56. The anchor nut 42, which is aligned with the anchor bolt hole 57, is fixed to the inner surface of the anchor projection 56. The outer diameter of the anchor nut 42 is smaller than the diameter of the nut hole 27. This enables the anchor nut 42 to move within the nut hole 27. In other words, the nut hole 27 restricts the movement of the anchor nut 42 within a predetermined area.

In addition to the five advantages of the first embodiment, the seat of the second embodiment has the following advantage.

(6) The force limiter bracket 52 is directly connected to the seat frame 9 but not to the upper support 6. Further, the belt anchor 44 is directly connected to the seat frame 9, which supports the seat cushion 7. Since the restraining force of the seat belt 43 is directly applied to the seat frame 9, the restraining force does not deform the rear sensor bracket 21. This enables accurate detection of only the load applied by a passenger sitting on the seat 1. For example, if the seat belt 43 is used to fasten a child safety seat to the seat 1, the restraining force of the seat belt 43 does not affect the rear load detector 51. Thus, the load of only the passenger sitting on the child safety seat is accurately detected.

It should be apparent to those skilled in the art that the present invention may be embodied in many other specific forms without departing from the spirit or scope of the invention. Particularly, it should be understood that the present invention may be embodied in the following forms.

Instead of using the fastening bolt 47, the anchor belt 45 may be welded to the force limiter brackets 22, 52.

The elongated holes 35, 53 may have a slot-like shape.

The present examples and embodiments are to be considered as illustrative and not restrictive, and the invention is not to be limited to the details given herein, but may be modified within the scope and equivalence of the appended claims.

What is claimed is:

1. A vehicle seat comprising:
   a seat cushion; and
   a load detector for detecting the load applied to the seat cushion, wherein the load detector includes:
      a sensor bracket having a deformation portion, which is deformed in accordance with the degree of the load;
      a strain sensor arranged on the deformation portion to detect the degree of deformation of the deformation portion;

a force limiter bracket adjacent to the sensor bracket to limit deformation of the deformation portion within a predetermined range; and an anchor bracket directly connected with the force limiter bracket, wherein the anchor bracket is attached to a seat belt.

2. The vehicle seat according to claim 1, wherein the seat is arranged on an upper support that moves with respect to a lower support, which is fixed to the floor of a passenger compartment, the seat further comprising:

a seat frame for supporting the seat cushion; and a first fastener for securing the sensor bracket to the upper support;

a second fastener for securing the sensor bracket to the seat frame;

a movement restriction surface formed on the force limiter bracket, wherein the movement restriction surface is spaced from one of the fasteners and permits the force limiter bracket to move within a predetermined range with respect to the one fastener, and the other fastener fixes the force limiter bracket to a corresponding one of the supports.

3. The seat according to claim 2, wherein the force limiter bracket is fixed to the sensor bracket and the seat frame by the first fastener.

4. The seat according to claim 2, wherein the force limiter bracket further includes a projection in which an anchor hole is formed, and the anchor bracket is connected to the projection by an anchor bolt, which is fitted in the anchor hole.

5. A vehicle seat arranged on an upper support that moves along a lower support, which is fixed to the floor of a passenger compartment, wherein the seat comprises:

a seat cushion;

a seat frame for supporting the seat cushion; and a load detector arranged between the upper support and the seat frame to detect the load applied to the seat cushion, wherein the load detector includes:

a sensor bracket having a deformation portion, which is deformed in accordance with the degree of the load, and first and second connecting holes;

a strain sensor arranged on the deformation portion to detect deformation of the deformation portion;

a force limiter bracket adjacent to the sensor bracket, the force limiter bracket having a fastening hole and a restricting hole, wherein the force limiter bracket limits deformation of the deformation portion within a predetermined range;

a first bolt fitted in the first connecting hole and the restricting hole to fix the sensor bracket to the seat frame;

a second bolt fitted in the second connecting hole and the fastening hole to fix the force limiter bracket to the upper support; and an anchor bracket directly connected with the force limiter bracket, the anchor bracket being attached to a seat belt.

6. The seat according to claim 5, wherein the first bolt is movably fitted in the restricting hole.

7. The seat according to claim 5, wherein the wall of the restricting hole and the outer surface of the first bolt defines a space for permitting movement of the first bolt within a predetermined area.

8. The seat according to claim 5, further comprising a spacer fitted to the first bolt to form a gap between the sensor bracket and the seat frame.

9. The seat according to claim 5, wherein the force limiter bracket further includes a projection in which an anchor hole is formed, and the anchor bracket is fastened to the projection by an anchor bolt, which is fitted in the anchor hole.

10. A vehicle seat arranged on an upper support that moves along a lower support, which is fixed to the floor of a passenger compartment, wherein the seat comprises:

a seat cushion;

a seat frame for supporting the seat cushion; and a load detector arranged between the upper support and the seat frame to detect the load applied to the seat cushion, wherein the load detector includes:

a sensor bracket having a deformation portion, which is deformed in accordance with the degree of the load, and first and second connecting holes;

a strain sensor arranged on the deformation portion to detect deformation of the deformation portion;

a force limiter bracket adjacent to the sensor bracket, the force limiter bracket having a fastening hole and a restricting hole, wherein the force limiter bracket limits deformation of the deformation portion within a predetermined range;

a first bolt fitted in the first connecting hole and the restricting hole to fix the sensor bracket to the seat frame;

a second bolt fitted in the second connecting hole and the restricting hole to fix the force limiter bracket to the upper support; and an anchor bracket directly connected with the force limiter bracket, the anchor bracket being attached to a seat belt.

11. The seat according to claim 10, wherein the second bolt is movably fitted in the restricting hole.

12. The seat according to claim 10, wherein the wall of the restricting hole and the outer surface of the second bolt defines a space for permitting movement of the second bolt within a predetermined area.

13. The seat according to claim 10, further comprising a spacer fitted to the second bolt to form a gap between the sensor bracket and the force limiter bracket.

14. The seat according to claim 10, wherein the force limiter bracket further includes a projection in which an anchor hole is formed, and the anchor bracket is fastened to the projection by an anchor bolt, which is fitted in the anchor hole.

15. A load detector arranged between a vehicle seat and the floor of a passenger compartment to detect the load applied to the seat, the load detector comprising:

a sensor bracket having a deformation portion, which is deformed in accordance with the degree of the load, and first and second connecting holes;

a strain sensor arranged on the deformation portion to detect deformation of the deformation portion;

a force limiter bracket adjacent to the sensor bracket, the force limiter bracket having a fastening hole aligned with the first connecting hole and a restricting hole aligned with the second connecting hole, wherein the force limiter bracket limits deformation of the deformation portion within a predetermined range; and an anchor bracket directly connected with the force limiter bracket, the anchor bracket being attached to a seat belt.

16. The load detector according to claim 15, wherein the restricting hole is larger than the second connecting hole.

17. The load detector according to claim 16, wherein the restricting hole is elongated.

18. The load detector according to claim 16, wherein the fastening hole and the first connection hole have substantially the same size.

* * * * *